US011513605B2

(12) United States Patent
Potts et al.

(10) Patent No.: US 11,513,605 B2
(45) Date of Patent: Nov. 29, 2022

(54) OBJECT MOTION TRACKING WITH REMOTE DEVICE

(71) Applicant: Microsoft Technology Licensing, LLC, Redmond, WA (US)

(72) Inventors: Lori Ann Potts, Sammamish, WA (US); Lev Cherkashin, Redmond, WA (US); David Rohn, Fort Collins, CO (US); Steven James Velat, Kirkland, WA (US); Andrew C. Goris, Loveland, CO (US); Scott Francis Fullam, Palo Alto, CA (US); Travis Scott Legg, Seattle, WA (US); Craig Haskins, Kirkland, WA (US); James Tichenor, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/949,268

(22) Filed: Oct. 22, 2020

(65) Prior Publication Data
US 2021/0034161 A1 Feb. 4, 2021

Related U.S. Application Data

(62) Division of application No. 15/012,694, filed on Feb. 1, 2016.

(51) Int. Cl.
*G06F 3/00* (2006.01)
*G06F 3/01* (2006.01)
(Continued)

(52) U.S. Cl.
CPC ........... *G06F 3/017* (2013.01); *G02B 27/017* (2013.01); *G06F 3/011* (2013.01); *G06F 3/0346* (2013.01); *G06F 3/0383* (2013.01); *G02B 2027/0138* (2013.01); *G02B 2027/0187* (2013.01); *G06F 2203/0384* (2013.01)

(58) Field of Classification Search
None
See application file for complete search history.

(56) References Cited

U.S. PATENT DOCUMENTS

2014/0009623 A1   1/2014   Lai et al.
2014/0145914 A1   5/2014   Latta et al.
(Continued)

FOREIGN PATENT DOCUMENTS

CN   101520690 A   9/2009
CN   101986243 A   3/2011
(Continued)

OTHER PUBLICATIONS

"Office Action Issued in Indian Patent Application No. 201847021421", dated Aug. 14, 2021, 7 Pages.
(Continued)

*Primary Examiner* — Michael A Faragalla
(74) *Attorney, Agent, or Firm* — Alleman Hall Creasman & Tuttle LLP

(57) ABSTRACT

Examples of mixed reality computing devices that utilize remote sensors and local sensors as input devices are disclosed. In one example, a mixed reality computing device comprises an image sensor, a remote input device, a processor, and storage comprising stored instructions. The stored instructions are executable by the processor to perform object motion tracking and environmental tracking based on output from the image sensor, and in response to detecting that the remote input device is in use, adjust a parameter of the motion tracking while maintaining the environmental tracking.

14 Claims, 5 Drawing Sheets

(51) Int. Cl.
*G02B 27/01* (2006.01)
*G06F 3/0346* (2013.01)
*G06F 3/038* (2013.01)

(56) References Cited

U.S. PATENT DOCUMENTS

| | | | | |
|---|---|---|---|---|
| 2014/0364209 | A1* | 12/2014 | Perry | A63F 13/33 |
| | | | | 463/31 |
| 2015/0022649 | A1 | 1/2015 | Koppal | |
| 2016/0044298 | A1* | 2/2016 | Holz | G06F 3/011 |
| | | | | 348/47 |
| 2016/0228771 | A1* | 8/2016 | Watson | A61B 5/4023 |
| 2017/0060230 | A1* | 3/2017 | Faaborg | G06T 19/006 |

FOREIGN PATENT DOCUMENTS

| | | |
|---|---|---|
| CN | 103809687 A | 5/2014 |
| EP | 2538305 A2 | 12/2012 |
| WO | 2014197230 A1 | 12/2014 |

OTHER PUBLICATIONS

"Summons to Attend Oral Proceedings Issued in European Patent Application No. 17702222.5", Mailed Date: Feb. 17, 2021, 11 Pages.
"First Office Action and Search Report Issued in Chinese Patent Application No. 201780004806.X", dated Nov. 4, 2020, 14 Pages.
"Office Action Issued in Indian Patent Application No. 202248007804", dated May 24, 2022, 5 Pages.

* cited by examiner

OBJECT MOTION TRACKING WITH REMOTE DEVICE

CROSS REFERENCE TO RELATED APPLICATIONS

This application is a divisional of U.S. patent application Ser. No. 15/012,694, filed Feb. 1, 2016, the entirety of which is hereby incorporated herein by reference for all purposes.

BACKGROUND

Various types of user input mechanisms may be employed to provide control signals to a computing device. For example, a computing device may utilize natural user inputs in the form of sensed physical actions (e.g., physical gestures, eye gaze, voice commands) performed by a user that are translated into control signals for the computing device.

SUMMARY

Examples of mixed reality computing devices that utilize remote sensors and local sensors as input devices are disclosed. In one example, a mixed reality computing device comprises an image sensor, a remote input device, a processor, and storage comprising stored instructions. The stored instructions are executable by the processor to perform object motion tracking and environmental tracking based on output from the image sensor, and in response to detecting that the remote input device is in use, adjust a parameter of the motion tracking while maintaining the environmental tracking.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Wearable mixed reality computing systems may rely on hand and arm gestures to control various actions carried out by the mixed reality computing system. These hand and arm gestures may be sensed and measured using a sensor capable of measuring the depth of objects in front of it, such as an image sensor (e.g. depth image sensor or stereo image sensor arrangement). These image sensors often have a limited sensing field of view, and because the image sensor is positioned on the wearable computing system, the sensor field of view is typically centered near an operator's head.

As such, a user may frequently raise and lower an arm to place the hand inside of the sensor field of view for gesture detection.

Thus, according to embodiments disclosed herein, a remote input device configured to be held in the hand of an operator of a mixed reality computing system may be selectively used to perform gesture inputs. By allowing gesture inputs to be detected via sensors of the remote input device, the need for the operator to repeatedly perform motion gestures in front of the image sensor of the wearable computing system may be lessened.

As described in more detail below, gesture motion tracking performed via the remote input device (e.g. via inertial motion sensors) may be less power-intensive than gesture motion tracking performed based on image sensor data. Thus, one or more parameters related to image sensor-based gesture motion tracking may be adjusted when the system detects that the remote input device is in use. For example, gesture motion tracking using the on-board image sensor of the mixed reality computing device may be disabled while the remote motion tracking is in use, or a frame rate of the image sensor gesture motion tracking may be reduced for gesture motion tracking. More generally, the capabilities and power consumption characteristics of each of a plurality of sensors capable of performing gesture motion tracking, positioned across the wearable computing system and the remote input device, may be considered when performing gesture motion tracking to adjust sensor use in various object tracking contexts. This may help to achieve a suitable balance of power consumption and motion tracking accuracy in each object tracking context, saving power where less accuracy is needed while achieving higher accuracy where appropriate.

Figure 1:
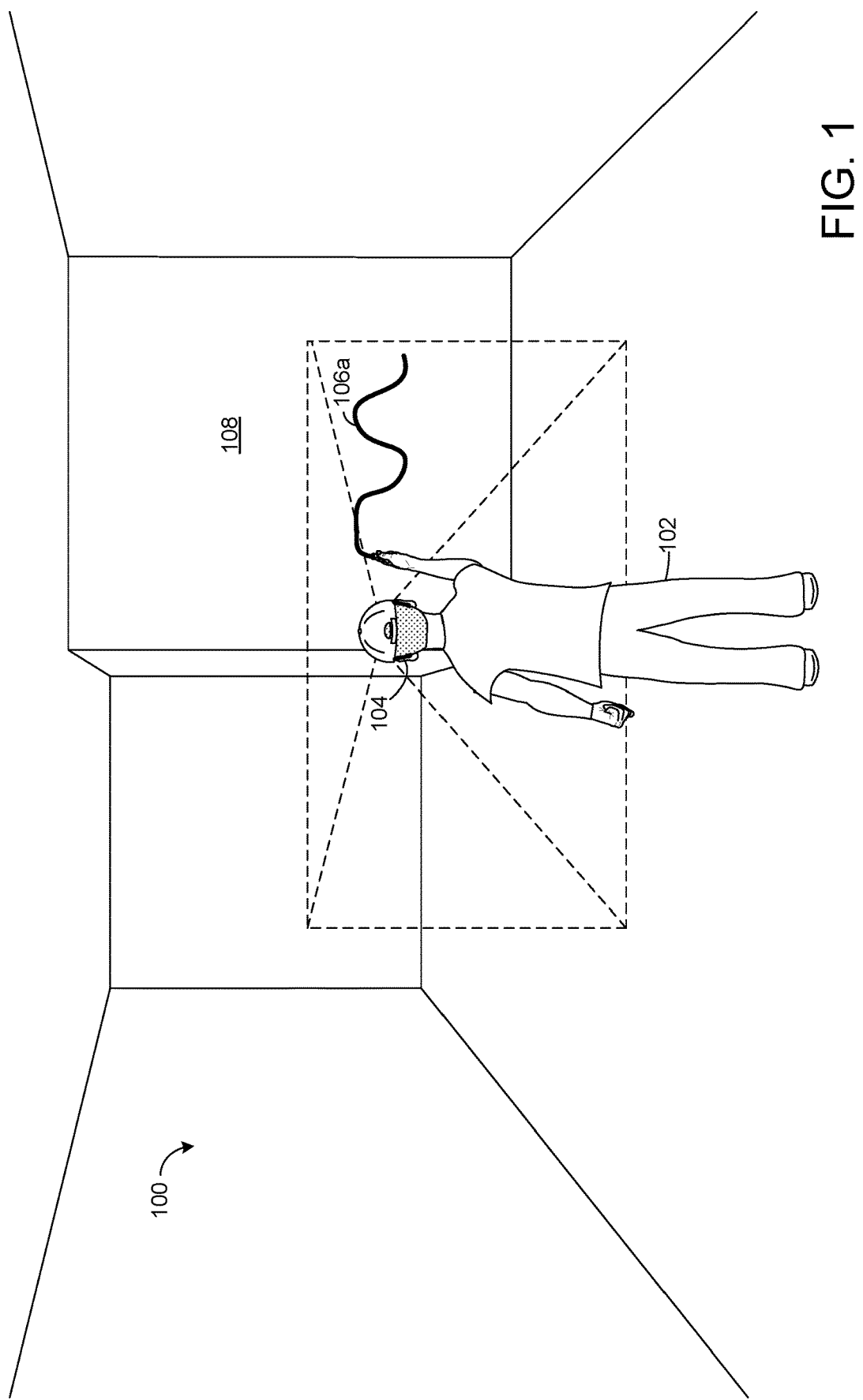
FIGS. 1 and 2 show an example use environment in which a user is wearing an example mixed reality computing device.

FIG. 1 shows an example use environment 100 in which a user 102 interacts with an example mixed reality (MR) computing device. MR computing device is shown in FIG. 1 in the form of a head-mounted display (HMD) device 104, but other examples may take any other suitable form. Example hardware configurations are described below with reference to FIGS. 5 and 6, respectively.

The HMD 104 provides user 102 a see-through view of environment 100. The HMD also displays augmented reality images to the user. In one example, the HMD is a stereoscopic display device, wherein two separate augmented reality images are each displayed on respective left-eye and right-eye displays of the HMD. When viewed by a wearer of the HMD (e.g., user 102), the two augmented reality images collectively form an augmented reality object perceivable by the wearer as part of environment 100. FIG. 1 depicts an example augmented reality object 106a.

HMD 104 may include one or more image sensors capable of imaging the environment 100. For example, HMD 104 may include a depth camera using time-of-flight, structured light, or other suitable depth-sensing technology to image environment 100. Based on the output from the depth camera, a model of the environment may be generated, and augmented reality images may be displayed based on the model of the environment.

To image the environment, the depth camera of the HMD 104 may transmit imaging light at a first, relatively high brightness in order to image the environment within a relatively long distance from the HMD, such as 30 feet. Because the environment is unlikely to change frequently, the imaging light transmitted to perform modeling of the environment (also referred to herein as environmental tracking) may be output at a relatively low frame rate, e.g., 1 Hz.

In contrast, when HMD 104 is transmitting light in order to perform object tracking (which may include tracking of a hand or finger of a user), the imaging light may be transmitted at a second, relatively low brightness in order to image the environment within a short distance from the HMD, such as within three feet. Because the position of the object being tracked is likely to change frequently, the imaging light transmitted to perform object tracking may be transmitted at a relatively high frame rate, e.g., 30 Hz.

In the example illustrated in FIG. 1, user 102 is creating an augmented reality drawing via gesture input. As shown, user 102 is creating a first drawing, depicted as augmented reality object 106*a*, along a wall 108. However, the augmented reality drawing is one non-limiting example of an action that may be executed in response to the gesture input, and other actions are possible. For example, the gesture input may be used to control a user interface or other suitable action. As shown in FIG. 1, the user 102 is performing the gesture input with his or her hand, and the motion of the user's hand is detected by one or more sensors of the HMD 104, such as a depth sensor as described above.

Figure 2:
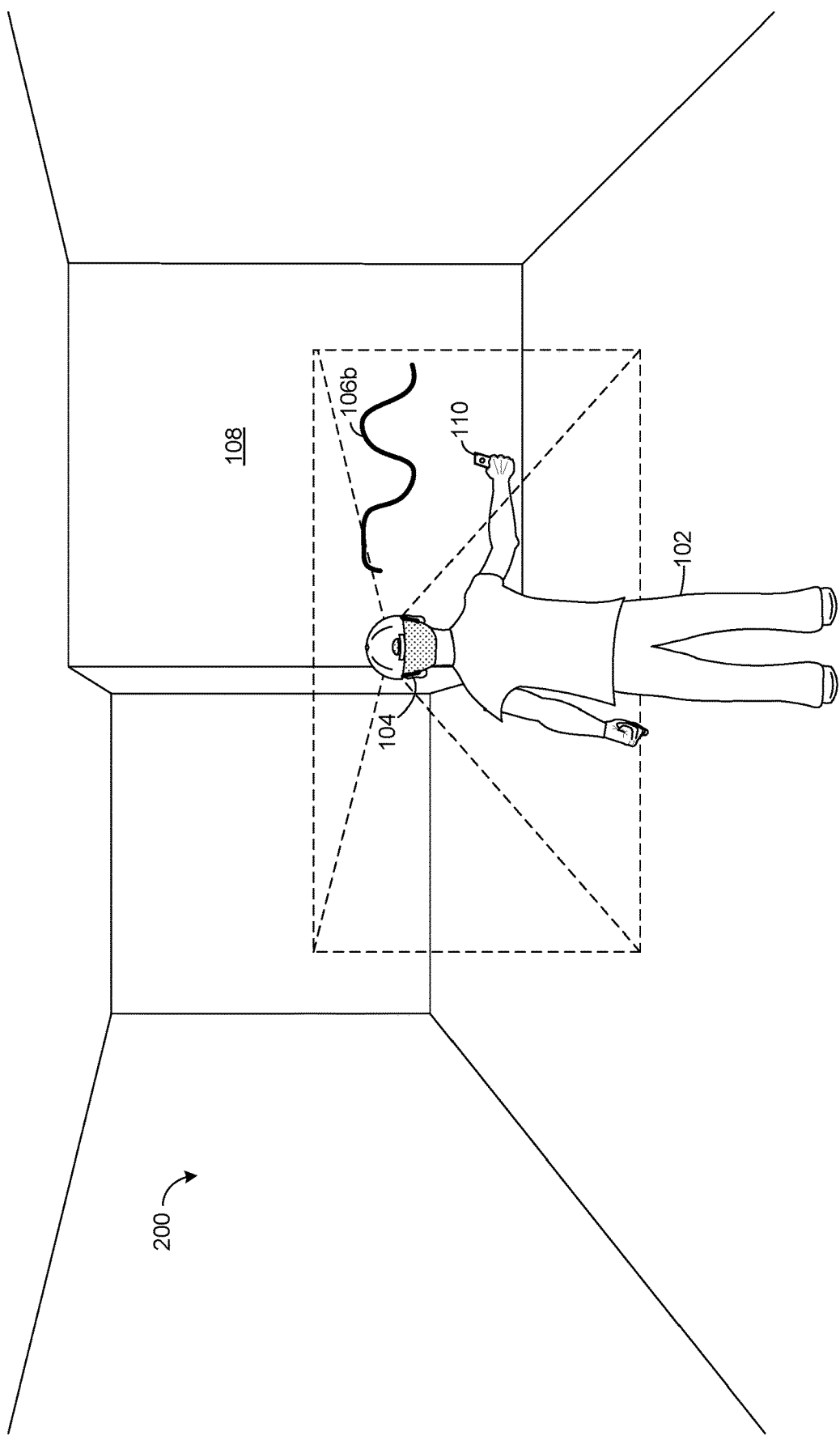

FIG. 2 shows a second example use environment 200 wherein user 102 is performing a gesture input to create another drawing, depicted as augmented reality object 106*b*, along the wall 108. The gesture motion performed by the user 102 to create the drawing is detected based on one or more sensors of a remote input device 110 communicatively coupled to the HMD 104.

The remote input device 110 may include any suitable sensor or sensors capable of detecting user gestures and/or user-actuated inputs. In one example, the remote input device 110 includes an inertial measurement unit (IMU) including one or more accelerometers, gyroscopes, momentary switches, and/or magnetometers. The remote input device 110 may further include a user-actuatable input device such as a button, track wheel, joystick, etc. The remote input device 110 may communicate with the HMD device 104 via a suitable mechanism, such as a wireless connection. Movement data (e.g., vertical and horizontal displacement, pitch, roll, yaw relative to a reference) sensed by the IMU and/or user-actuated input may be communicated to the HMD from the remote input device directly or via a remote computing system and used by the HMD to control actions on the HMD, such as translate gesture movement to user interface controls.

As mentioned above, the remote input device 110 may selectively adjust the operation of the depth sensor system of the HMD. This allows for decreased power draw by the HMD, as no power is used for the imaging system when it is off. More particularly, the HMD 104 may include a depth image sensor configured to transmit imaging light (e.g., infrared light) and determine the depth of objects in the field of view of the sensor based on the reflected imaging light. The motion of various objects in the field of view, particularly a user's hand, arm, or finger, may be tracked in order to use the detected gestures as input to control various aspects of the HMD. However, such gesture/object motion tracking may be resource intensive, due to the output of imaging light, reception of the reflected imaging light, and processing of the signals from the received light at a relatively high frame rate to determine object motion. Thus, when the remote input device is in use, the gesture/object motion tracking based on the HMD image sensor may be adjusted to reduce power consumption. In other examples, the image sensor of the HMD may be used in conjunction with the sensors of the remote input device to achieve a suitable balance of accuracy and power consumption.

Figure 3:
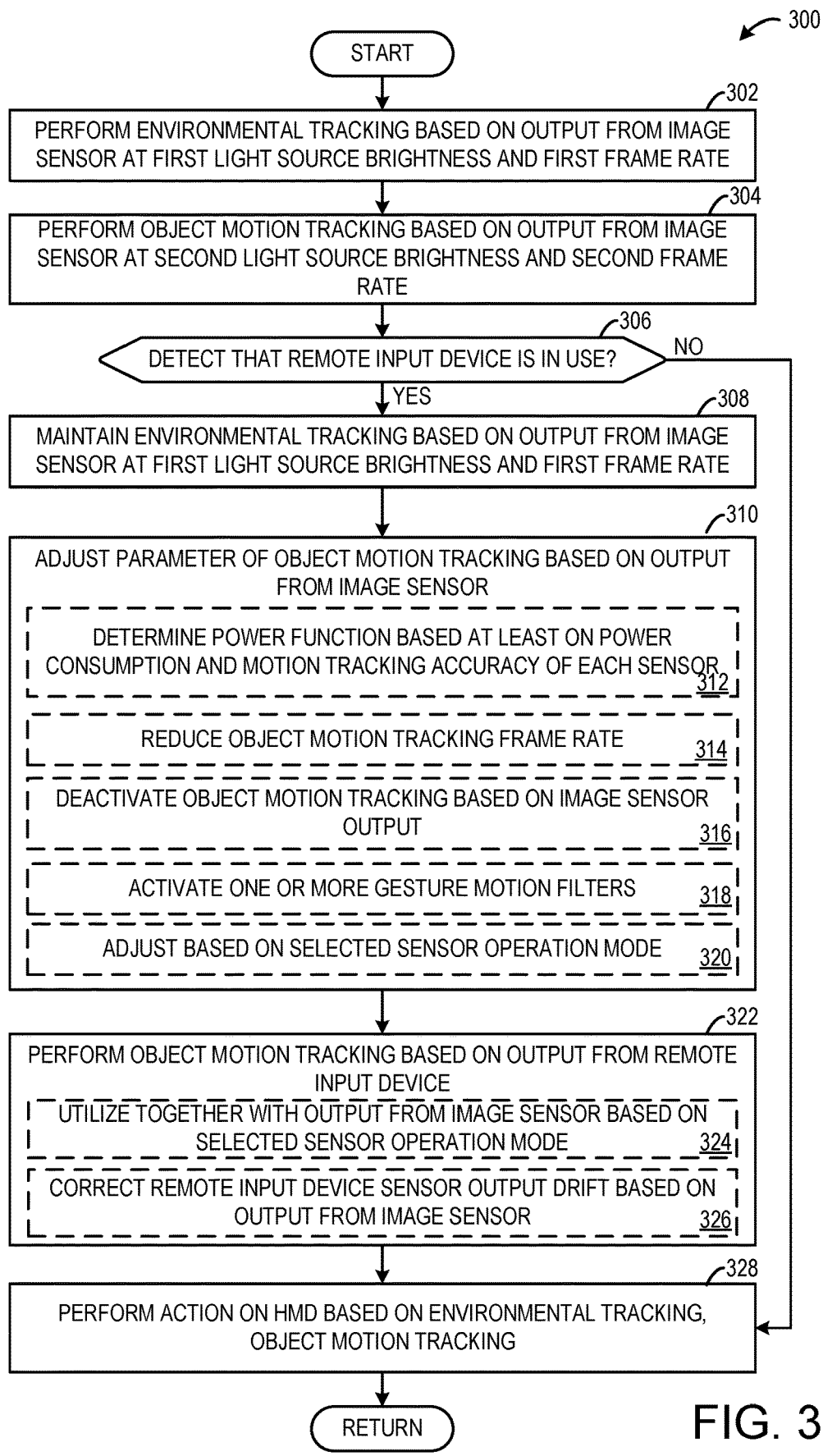
FIG. 3 is a flow chart illustrating an example method for performing object motion tracking using one or more of a mixed reality computing device and remote input device.

FIG. 3 shows a flow diagram depicting an example method 300 for performing object motion tracking using one or both of a computing system image sensor and one or more sensors from a remote input device communicatively coupled to the computing system. Method 300 may be carried out by a mixed reality computing system, such as the HMD 104 of FIGS. 1 and 2, in conjunction with a remote input device, such as remote input device 110 of FIG. 2, as examples.

At 302, method 300 includes performing environmental tracking based on output from the image sensor at a first light source brightness and first frame rate. As explained above, the computing system (e.g., HMD) may include an image sensor such as depth sensor that can perform both environmental and object tracking. When performing the environmental tracking, the image sensor system may transmit imaging light at a first brightness to image the environment a relatively far distance from the image sensor at a low frame rate. The received reflected imaging light may be used to build a model of the environment, which may in turn be used to generate augmented reality objects for display via a display device of the HMD.

At 304, method 300 includes performing object motion tracking based on output from the image sensor at a second light source brightness and second frame rate. The imaging light transmitted from the image sensor system of the computing system may also be transmitted at a lower brightness for tracking of objects within a close distance to the image sensor. The object tracking may be performed at a relatively high frame rate. The received imaging light may be used to track the motion of an object, such as hand of a user, in order to perform gesture control of the HMD, for example.

At 306, method 300 determines if the remote input device is in use. The remote input device may be determined to be in use in any suitable manner. As one example, the remote input device may be determined to be in use if the image sensor of the HMD detects the remote input device in its field of view (e.g. using object recognition analysis of image data via edge recognition methods or other suitable algorithms). As another example, the remote input device may be determined to be in use based on receipt of a user input configured to activate the remote input device (e.g., if a user actuates a switch or other input mechanism of the remote input device). As a further example, the remote input device may be determined to be in use based on output received from the sensors of the remote input device (e.g. if motion signals from the remote input device indicate a change from an unmoved state to a moved state, a change in orientation to an orientation associated with use, etc.).

If it is determined that the remote input device is not in use, method 300 proceeds to 328, explained in more detail below. On the other hand, if it is determined that the remote input device is in use, method 300 comprises, at 308, maintaining the environmental tracking based on output from the image sensor at the first light source brightness and first frame rate. Thus, regardless of which sensor(s) will be used to perform object motion tracking, the environmental tracking is maintained to continue generating an accurate model of the environment.

Further, at 310, method 300 comprises adjusting one or more parameters of the object motion tracking based on output from the image sensor. When the remote input device is in use, in some instances it may be advantageous to disable or adjust the object motion tracking performed by the HMD based on output form the HMD image sensor, in order to conserve power usage. Any suitable method may be used to determine how to adjust the one or more parameters of object motion tracking. In some examples, a power function may be utilized, wherein the power function represents the accuracies and power consumption of each of the motion tracking sensors for various possible states of the sensors. This may allow selection of object tracking parameters for the sensors that suitably balance accuracy and power consumption for a current use context. Accordingly, at 310, method 300 determines a power function based at least on power consumption and motion tracking accuracy of each sensor. Data regarding the power consumption of each sensor may be predetermined and/or tracked over time. Likewise, motion tracking accuracy data also may be predetermined (e.g. during device development or manufacturing), and/or may be determined during use (e.g. via calibration).

Any suitable parameters for object tracking may be adjusted. For example, adjusting the object motion tracking may include reducing an object motion tracking frame rate for image-based object tracking, as indicated at 314. As explained previously, the object motion tracking performed by the HMD may be performed at a relatively high frame rate (e.g., 30 Hz). Thus, when the remote input device is in use, the frame rate of this object motion tracking may be reduced to conserve power. The frame rate may be reduced to any suitable rate. As one non-limiting example, a 30 Hz rate may be reduced to 10 Hz. In another example, adjusting the object motion tracking may include deactivating the image-based object motion tracking, as indicated at 316.

Adjusting object motion tracking further may include activating one or more gesture filters, as indicated at 318. In some instances, object tracking may be performed solely by the remote input device. As such, it is unlikely the user would bring his or her hands in front of the image sensor of the HMD for the purposes of gesture inputs to control the HMD. Thus, the one or more gesture motion filters may act to filter out motion detected in front of the image sensor of the HMD, thus ignoring or discarding potentially unnecessary or unintentional motion in front of the HMD and lowering power consumption. The one or more gesture motion filters may discard motion data that occurs within a threshold distance of the image sensor of the HMD, discard motion data that occurs for only a threshold time period, and/or perform any other suitable filtering.

In some examples, discrete, predefined operating modes may be used in various object tracking contexts. As such, adjusting one or more parameters of object motion tracking may be based on a change in selected sensor operation mode, as indicated at 320. Various contextual factors may be used to determine a sensor operating mode, such as a nature of an object being tracked (e.g. large or small), a type of motion occurring (e.g. linear v. non-linear), and desired accuracy of the tracking (e.g., based upon a current use context, such as interacting with large, well-spaced graphical user interface features or authoring a detailed, fine-scale augmented reality image). Power function information also may be used to select a mode. As a more specific example, a first sensor operation mode may include performing motion tracking using the output from the remote input device IMU, and not from the HMD image sensor. Such a mode may be used for object motion tracking conditions in which power savings may be prioritized over accuracy, such as for tracking linear motion of an object. Likewise, an example second sensor operation mode may include performing motion tracking using output from the image sensor, with or without the remote input device IMU output. Such a mode may be used where accuracy of the remote input device IMU may outweigh the power savings of the IMU.

At 322, method 300 includes performing object motion tracking based on output from the remote input device. This may include utilizing the output from the image sensor in combination with the output from one or more sensors of the remote input device based on the selected sensor operation mode, as indicated at 324. This may also include correcting any remote input device sensor output drift based on output from the image sensor, as indicated at 326. As explained above, the remote input device may include an IMU to detect movement of the remote input device. While motion tracking based on output from the IMU may have a relatively low power consumption compared to motion tracking based on output from a depth sensor, IMU motion data is prone to drift, which over time can accumulate and create errors in object tracking. Thus, when the IMU output starts to drift (e.g., the IMU indicates the object is greater than a threshold distance from that object's location as determined by output from the depth sensor), the object tracking performed by the image sensor may be used to correct the IMU drift.

At 328, method 300 includes performing an action on the HMD based on the environmental tracking and object motion tracking. The action may include any suitable computing device action, such as a selection of a user interface object, creation of an augmented reality object, cursor control, game control, and/or other operating system or application interactions. Method 300 then returns.

Figure 4:
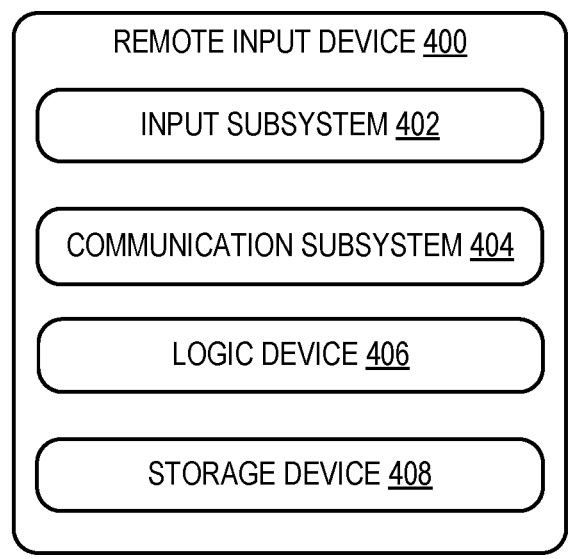
FIG. 4 shows a block diagram of an example remote input device.

FIG. 4 schematically shows a block diagram of an example remote input device 400 configured to provide positional/movement data to a mixed reality computing system, such as to HMD 104. Remote input device 400 includes an input subsystem 402 and a communication subsystem 404. Remote input device 400 optionally includes a logic device 406, a storage device 408, and/or other components not shown in FIG. 4.

Input subsystem 402 may comprise or interface with one or more user-actuatable input devices such as a button, track wheel, keyboard, mouse, touch screen, or game controller. Input subsystem 402 may further include one or more sensors configured to determine the relative position and/or track motion of the remote input device 400. Examples of such sensors include but are not limited to an inertial movement unit (IMU), image sensors, momentary switches, magnetometers, and/or other sensors.

The IMU may be configured to provide position and/or orientation data of the remote input device 400 to the logic subsystem, to a controller of the HMD in communication with the remote input device 400, and/or to a remote computing system. In one embodiment, the IMU may be configured as a three-axis or three-degree of freedom position sensor system. This example position sensor system may, for example, include three gyroscopes to indicate or measure a change in orientation of the remote input device 400 within 3D space about three orthogonal axes (e.g., x, y, z).

In another example, the IMU may be configured as a six-axis or six-degree of freedom position sensor system. Such a configuration may include three accelerometers and three gyroscopes to indicate or measure a change in location of the remote input device 400 along the three orthogonal axes and a change in device orientation about the three orthogonal axes (e.g., roll, pitch, yaw).

Communication subsystem 404 may be configured to communicatively couple remote input device 400 with one or more other computing devices, such as HMD 104. Communication subsystem 404 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow remote input device 400 to send and/or receive messages to and/or from other devices via a network such as the Internet.

The data from the remote input device sensors may be sent individually or processed locally to determine combined sensor data, and the data may be sent to the HMD 104 for the purposes of experience control. In an example, pitch and yaw data may be derived from the fusion of the motion sensors. When the momentary switch is pressed the exact orientation of the system is measured and used as the 'zero' point for both pitch and yaw. As the device is angularly displaced, all angle data is reported relative to the starting orientation.

In other embodiments, a capacitive touch sensor located under the area where the thumb of the user would normally rest is used. As the thumb (or other part of the body) is pressed against the surface of the capacitive touch sensor and moved, the horizontal and vertical location of the digit is sent via a wireless connection to the HMD 104.

In a further embodiment a multidirectional switch (also known as a joystick) is used. As the joystick is moved, the horizontal and vertical location of the joystick is sent via a wireless connection to the HMD. In a different embodiment a variety of switches and wheel input device (a circular pad that can be continuously rotated with a finger that reports amount of rotation and direction) may be included. As the wheel is moved, the rotation and switch data is sent via a wireless connection to the HMD 104. In the embodiments described above, the switches may be configured such that they report force applied.

The data connection between the remote input device 400 and the HMD may be two-way. This two way data link can be used to send information that triggers a haptic event on the device. In the above embodiments, a haptic feedback system can be included to provide tactile feedback to the holder of the remote input device.

In further examples, the orientation and location of the remote input device 400 may be measured using multiple cameras that detect the surrounding scenery, track the scenery, and use a location of the scenery to infer location and orientation of the remote input device. The location and orientation computation can be performed either on the remote input device (e.g., via the logic and/or storage subsystems) or the data can be sent to a remote system for analysis with the results sent back to the remote input device and/or HMD. This location and orientation data (and the changes to said data over time) can then be used to generate commands sent via a wireless connection to the HMD.

A finger print sensor may be included to allow authentication of the user. Authentication can also be accomplished via specific motion data (gestures) that the user performs in place of an alphanumeric password entered via a keyboard. The device can include non-rechargeable batteries or rechargeable batteries. Charging of the cells (the case where the cells are rechargeable) can be accomplished via a wired connection or via a wireless connection.

The power draw of the device can be reduced by keeping the device in a low power state when not in active use. This non active state can be detected through the use of a capacitive sensor that detects the presence of a human hand. When the sensor no longer detects the presence of the hand, it may switch into a low power state. The device can also enter into a low power state after the detection of no motion (a motion sensor reports no motion after a preset period of time). It can then be awakened by either the detection of new motion or when an included momentary switch (or other suitable switch) is actuated.

The HMD 104 may provide visual feedback related to the motion and orientation of the remote input device. Further, the motion and displacement data from the remote input device may control information scroll speed on the HMD. This motion and displacement data can also control absolute cursor location on the HMD.

Additionally, the remote input device may contain haptic feedback devices. The haptic feedback can be generated locally based on device sensor and state information or from the HMD based on data inside of the HMD.

Multiple finger actuated input devices may be included, such as sliders (either reporting discrete digital actuation data or analog reporting continuous actuation data), pressure sensors to measure and report finger/hand pressure between the finger/hand and the device, or pressure sensors to measure force between the device and external objects such as the surface of a table or desk.

When included, logic device 406 includes one or more physical devices configured to execute instructions. For example, the logic device may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

When included, storage device 408 includes one or more physical devices configured to hold instructions executable by the logic device to implement the methods and processes described herein. When such methods and processes are implemented, the state of storage device 404 may be transformed—e.g., to hold different data.

Figure 5:
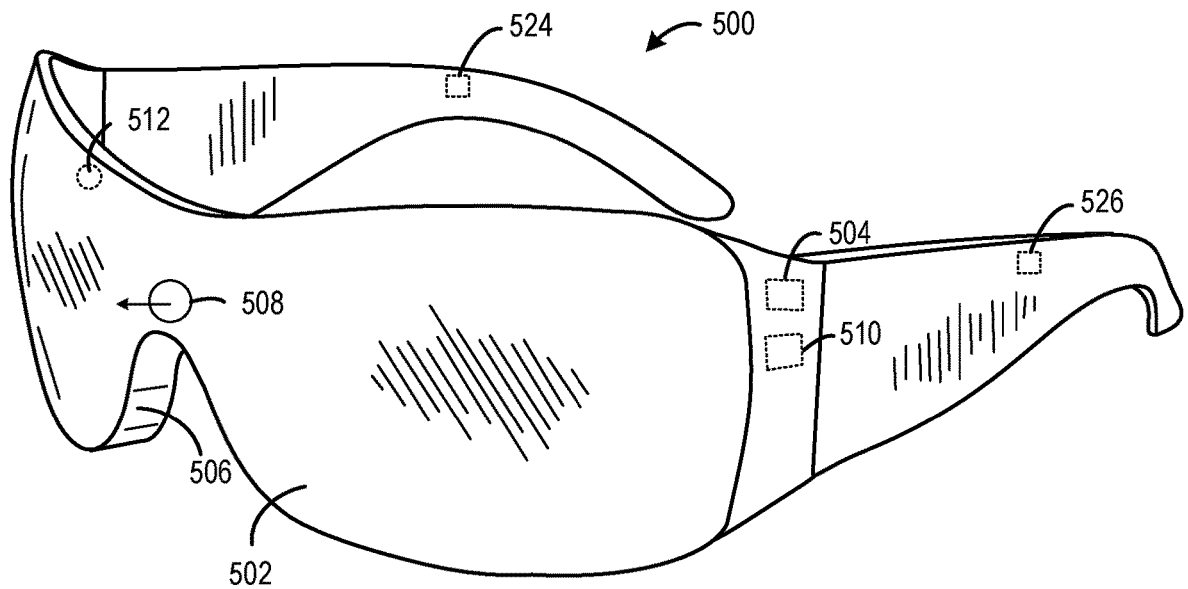
FIGS. 5 and 6 schematically show an example mixed reality computing device.

FIG. 5 shows a non-limiting example of an HMD device 500 in the form of a pair of wearable glasses with a transparent display 502. In other examples, an HMD device may take any other suitable form in which a transparent, semi-transparent, and/or non-transparent display is supported in front of a viewer's eye or eyes. HMD device 500 is a non-limiting example of a mixed reality computing device useable with a remote input device.

The HMD device 500 includes a controller 504 configured to control operation of the see-through display 502. The see-through display 502 may enable images such as holographic objects to be delivered to the eyes of a wearer of the HMD device 500. The see-through display 502 may be configured to visually augment an appearance of a real-world, physical environment to a wearer viewing the physical environment through the transparent display. For example, the appearance of the physical environment may be augmented by graphical content that is presented via the transparent display 502 to create a mixed reality environment. In one example, the display may be configured to display one or more visual digital content items. In some cases, the digital content items may be virtual objects overlaid in front of the real-world environment. Likewise, in some cases, the digital content items may incorporate elements of real-world objects of the real-world environment seen through the transparent display 502.

Any suitable mechanism may be used to display images via transparent display 502. For example, transparent display 502 may include image-producing elements located within lenses 506 (such as, for example, a see-through Organic Light-Emitting Diode (OLED) display). As another example, the transparent display 502 may include a light modulator located within a frame of HMD device 500. In this example, the lenses 506 may serve as a light guide for delivering light from the light modulator to the eyes of a wearer. Such a light guide may enable a wearer to perceive a 3D holographic image located within the physical environment that the wearer is viewing, while also allowing the wearer to view physical objects in the physical environment, thus creating a mixed reality environment.

The HMD device 500 may also include various sensors and related systems to provide information to the controller 504. Such sensors may include, but are not limited to, a microphone 512, one or more outward facing image sensors 508, and an inertial measurement unit (IMU) 510.

Microphone 512 may be any suitable microphone configured to capture sound, and may include a single microphone or an array of microphones positioned at suitable location(s) on the HMD device 500. As a non-limiting example, the microphone array may include six microphones located on different portions of the HMD device 500.

The one or more outward facing image sensors 508 may be configured to capture visual data from the physical environment in which the HMD device 500 is located. For example, the outward facing sensors 508 may be configured to detect movements within a field of view of the display 502, such as movements performed by a wearer or by a person or physical object within the field of view. In one example, the outward facing sensors 508 may detect a remote input device, such as remote input device 400, being used by a user to input gesture motion. The outward facing sensors may also capture 2D image information and depth information from the physical environment and physical objects within the environment. For example, the outward facing image sensors 508 may be configured to collect image data of a physical environment, lighting data regarding an ambient light condition of the physical environment, depth data of surfaces in the physical environment, material property data of surfaces in the physical environment, etc. In one example, the one or more outward-facing image sensors 508 may comprise an infrared time-of-flight depth camera. In another example, the one or more outward-facing image sensors 508 may comprise an infrared structured light depth camera.

Data from the one or more outward facing image sensors 508 may be used by the controller 504 to detect movements within a field of view of the see-through display 502. Examples of such movements include gesture-based inputs or other movements performed by a wearer or by a person or physical object within the field of view. In one example, data from the outward facing image sensors 508 may be used to detect a gesture input performed by the wearer of the HMD (e.g., a pinching of fingers, closing of a fist, etc.), that indicates a virtual interaction with a user interface visually presented via the HMD. Data from the outward facing image sensors 508 may be used by the controller 504 to determine direction/location and orientation data (e.g., from imaging environmental features) that enables position/motion tracking of the HMD 500 in the real-world environment. Data from the outward facing image sensors 508 may be used by the controller 504 to construct still images and/or video images of the surrounding environment from the perspective of the HMD 500.

The controller 504 may be configured to identify surfaces of the physical space in any suitable manner. In one example, surfaces of the physical space may be identified based on a depth map derived from depth data provided by the depth camera and/or image sensors. Additionally or alternatively, information from outward facing image sensors may be communicated to a remote computer responsible for generating and/or updating a model of the physical space. In either case, the relative position and/or orientation of the HMD 500 relative to the physical space may be assessed so that augmented-reality images may be accurately displayed in desired real-world locations with desired orientations. In one example, the controller 504 may be configured to perform simultaneous localization and mapping (SLAM) of a physical space using information provided by a surface sensor, alone or in combination with other sensors of the HMD 500. In particular, the controller 504 may be configured to generate a 3D model of the physical space including surface reconstruction information that may be used to identify surfaces in the physical space.

The IMU 510 may be configured to provide position and/or orientation data of the HMD device 500 to the controller 504. In one embodiment, the IMU 510 may be configured as a three-axis or three-degree of freedom position sensor system. This example position sensor system may, for example, include three gyroscopes to indicate or measure a change in orientation of the HMD device 500 within 3D space about three orthogonal axes (e.g., x, y, z). The orientation derived from the sensor signals of the IMU may be used to determine a direction of a user that has engaged the wearer of the HMD device in a conversation.

In another example, the IMU 510 may be configured as a six-axis or six-degree of freedom position sensor system. Such a configuration may include three accelerometers and three gyroscopes to indicate or measure a change in location of the HMD device 500 along the three orthogonal axes and a change in device orientation about the three orthogonal axes (e.g., roll, pitch, yaw). In some embodiments, position and orientation data from the image sensor 508 and the IMU 510 may be used in conjunction to determine a position and orientation of the HMD device 500.

The HMD 500 may also support other suitable positioning techniques, such as GPS or other global navigation systems. Further, while specific examples of position sensor systems have been described, it will be appreciated that any other suitable sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

The HMD device 500 may further include speakers 524 and 526 configured to output sound to the wearer of the HMD device. The speakers 524 and 526 may be positioned on each side frame portion of the HMD device proximate to the wearer's ears. For example, the speakers 524 and 526 may play audio content such as music, or a soundtrack to visual content displayed via the see-through display 502. In some cases, a volume of the speakers may be lowered or muted in response to a conversation between the wearer and another person being detected.

Figure 6:
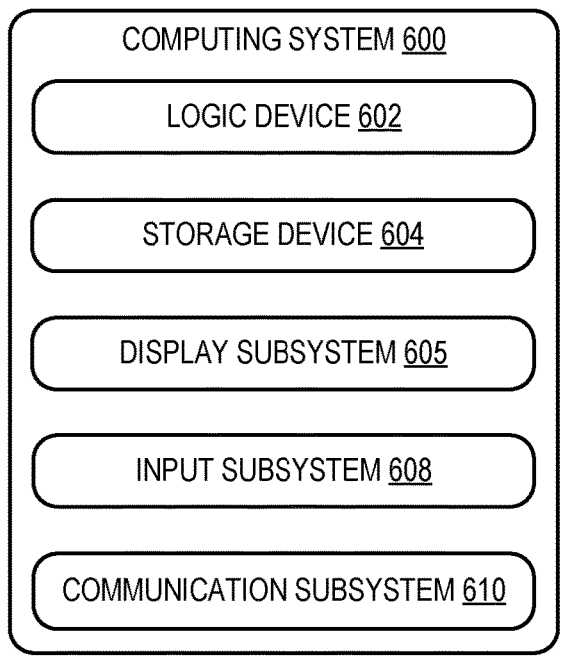

The controller 504 may include a logic machine and a storage machine, discussed in more detail below with respect to FIG. 6, in communication with the display and the various sensors of the HMD 500.

In some embodiments, the methods and processes described herein may be tied to a computing system of one or more computing devices. In particular, such methods and processes may be implemented as a computer-application program or service, an application-programming interface (API), a library, and/or other computer-program product.

HMD device 500 is one example of a computing system on which the examples disclosed herein may be implemented. More generally, FIG. 6 schematically shows a block diagram of an example non-limiting embodiment of a computing system 600 that can enact one or more of the methods and processes described above. Computing system 600 is shown in simplified form. In addition to the HMD devices described herein, computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic device 602 and a storage device 604. Computing system 600 may optionally include a display subsystem 705, input subsystem 608, communication subsystem 610, and/or other components not shown in FIG. 6.

Logic device 602 includes one or more physical devices configured to execute instructions. For example, the logic device may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device optionally may be distributed among two or more separate devices, which may be remotely located and/or configured for coordinated processing. Aspects of the logic device may be virtualized and executed by remotely accessible, networked computing devices configured in a cloud-computing configuration.

Storage device 604 includes one or more physical devices configured to hold instructions executable by the logic device to implement the methods and processes described herein. When such methods and processes are implemented, the state of storage device 604 may be transformed—e.g., to hold different data.

Storage device 604 may include removable and/or built-in devices. Storage device 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage device 604 may include volatile, nonvolatile, dynamic, static, read/write, read-only, random-access, sequential-access, location-addressable, file-addressable, and/or content-addressable devices.

It will be appreciated that storage device 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic device 602 and storage device 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 600 implemented to perform a particular function. In some cases, a program may be instantiated via logic device 602 executing instructions held by storage device 604. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 605 may be used to present a visual representation of data held by storage device 604. This visual representation may take the form of a graphical user interface (GUI). As the herein described methods and processes change the data held by the storage device, and thus transform the state of the storage device, the state of display subsystem 605 may likewise be transformed to visually represent changes in the underlying data. Display subsystem 605 may include one or more display devices utilizing virtually any type of technology. Such display devices may be combined with logic device 602 and/or storage device 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Another example provides a mixed reality computing device including an image sensor; a remote input device; a processor; and storage comprising stored instructions executable by the processor to perform object motion tracking and environmental tracking based on output from the image sensor, and in response to detecting that the remote input device is in use, adjust a parameter of the motion tracking while maintaining the environmental tracking. Such an example additionally or alternatively may include instructions executable to adjust the parameter of the motion tracking by reducing a frame rate of the motion tracking while maintaining a frame rate of the environmental tracking. Such an example may additionally or alternatively include instructions executable to adjust the parameter of the motion tracking by executing the instructions to deactivate the motion tracking based on output from the image sensor and perform motion tracking based on output from the remote input device. Such an example additionally or alternatively may include a light source and instructions executable to perform the object motion tracking by activating the light source at a first brightness, and to perform the environmental tracking by activating the light source at a second brightness. The remote input device may alternatively or additionally include an inertial measurement unit (IMU) and a user-actuatable input device. Such an example additionally or alternatively may include instructions executable to detect that the remote input device is in use based on one or more of detecting that the remote input device is in a field of view of the image sensor, receiving a user input via the user-actuatable input device of the remote input device, and receiving output from the IMU of the remote input device. Such an example may additionally or alternatively includes instructions executable to, in response to detecting that the remote input device is in use, perform object motion tracking based on output from the IMU of the remote input device. The remote input device further may alternatively or additionally include one or more image sensors. Any or all of the above-described examples may be combined in any suitable manner in various implementations.

Another example provides a mixed reality computing system including a head-mounted display device; a remote input device; a plurality of sensors distributed between the head-mounted display device and the remote input device; storage comprising stored instructions; and a processor configured to execute the instructions to receive output from the plurality of sensors, obtain a power function based at least on a power consumption and accuracy for the plurality of sensors, select a sensor operation mode based at least on the power function, and perform object motion tracking according to the selected sensor operation mode. In such an example the sensor operation mode additionally or alternatively may determine a selection of sensor outputs to be used to perform the object motion tracking. In such an example, the sensors additionally or alternatively may include one or more of an accelerometer, a gyroscope, and an image sensor. In such an example, the image sensor may additionally or alternatively be located on the head-mounted display device and wherein the accelerometer and the gyroscope may additionally or alternatively be located on the remote input device. Such an example additionally or alternatively may include instructions executable to perform object motion tracking according to a first selected sensor operation mode utilizing one or more of the accelerometer and gyroscope. Such an example additionally or alternatively may include instructions executable to, during object motion tracking according to the first selected sensor operation mode, correct motion tracking errors introduced by one or more of the accelerometer and gyroscope based on output from the image sensor. Such an example additionally or alternatively may include instructions executable to perform object motion tracking according to a second selected sensor operation mode utilizing the image sensor. Any or all of the above-described examples may be combined in any suitable manner in various implementations.

Another example provides a mixed reality computing system including a head-mounted display device; a remote input device; a plurality of sensors distributed between the head-mounted display device and the remote input device; a processor; and storage comprising stored instructions executable by the processor to in response to determining that the remote input device is in use, activate one or more gesture motion filters and perform object motion tracking based on output from one or more sensors of the plurality of sensors and the one or more gesture motion filters; and in response to determining that the remote input device is not in use, deactivate the one or more gesture motion filters. in such an example, the one or more gesture motion filters may additionally or alternatively include one or more of a first gesture motion filter to filter out detected object motion occurring within a threshold distance of the image sensor and a second gesture motion filter to filter out detected object motion that stays within a field of view of the image sensor for less than a threshold amount of time. Such an example may additionally or alternatively include instructions executable to, in response to determining the remote input device is in use, reduce a frame rate of the object motion tracking and in response to determining that the remote input device is not in use, increase the frame rate of the object motion tracking. in such an example, the remote input device may additionally or alternatively include an inertial measurement unit (IMU) and a user-actuatable input device, and instructions executable to detect that the remote input device is in use based on one or more of detecting that the remote input device is in a field of view of the image sensor, receiving a user input via the user-actuatable input device of the remote input device, and receiving output from the IMU of the remote input device. Such an example may additionally or alternatively includes instructions executable to perform an action based on the object motion tracking. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A mixed reality computing system, comprising:
a head-mounted display device;
a remote input device;

a plurality of sensors distributed between the head-mounted display device and the remote input device, the plurality of sensors comprising an image sensor;
a processor; and
storage comprising stored instructions executable by the processor to
in response to determining that the remote input device is in use, activate one or more gesture motion filters and perform object motion tracking based on output from one or more sensors of the plurality of sensors and the one or more gesture motion filters, wherein the one or more gesture motion filters comprise one or more of a first gesture motion filter to filter out detected object motion occurring within a threshold distance of the image sensor and a second gesture motion filter to filter out detected object motion that stays within a field of view of the image sensor for less than a threshold amount of time; and
in response to determining that the remote input device is not in use, deactivate the one or more gesture motion filters.

2. The mixed reality computing system of claim 1, wherein the instructions are executable to, in response to determining the remote input device is in use, reduce a frame rate of the object motion tracking, and in response to determining that the remote input device is not in use, increase the frame rate of the object motion tracking.

3. The mixed reality computing system of claim 1, wherein the remote input device comprises an inertial measurement unit (IMU) and a user-actuatable input device, and wherein the instructions are further executable to detect that the remote input device is in use based on one or more of detecting that the remote input device is in the field of view of the image sensor, receiving a user input via the user-actuatable input device of the remote input device, and receiving output from the IMU of the remote input device.

4. The mixed reality computing system of claim 1, wherein the instructions are further executable to perform an action based on the object motion tracking.

5. A method for adjusting gesture motion filters in a mixed reality computer system comprising a head-mounted display device, a remote input device, and a plurality of sensors distributed between the head-mounted display device and the remote input device, the method comprising:
determining that the remote input device is in use;
reducing a frame rate of object motion tracking when the remote input device is in use;
activating one or more gesture motion filters;
performing the object motion tracking based on output from one or more sensors of the plurality of sensors and the one or more gesture motion filters;
determining that the remote input device is not in use;
increasing the frame rate of the object motion tracking when the remote input device is not in use; and
deactivating the one or more gesture motion filters.

6. The method of claim 5, further comprising one or more of
filtering out detected object motion occurring within a threshold distance of an image sensor, or
filtering out detected object motion that stays within a field of view of the image sensor for less than a threshold amount of time.

7. The method of claim 5, wherein determining that the remote input device is in use further comprising detecting that the remote input device is in a field of view of an image sensor.

8. The method of claim 5, wherein determining that the remote input device is in use further comprising receiving a user input via a user-actuatable input device of the remote input device.

9. The method of claim 5, wherein determining that the remote input device is in use further comprising receiving an output from an inertial measurement unit (IMU) of the remote input device.

10. The method of claim 5, further comprising executing an action based on the object motion tracking.

11. A mixed reality computing system, comprising:
a head-mounted display device;
a remote input device;
a plurality of sensors distributed between the head-mounted display device and the remote input device;
a processor; and
storage comprising stored instructions executable by the processor to
in response to determining that the remote input device is in use, activate one or more gesture motion filters, perform object motion tracking based on output from one or more sensors of the plurality of sensors and the one or more gesture motion filters, and reduce a frame rate of the object motion tracking; and
in response to determining that the remote input device is not in use, deactivate the one or more gesture motion filters, and increase the frame rate of the object motion tracking.

12. The mixed reality computing system of claim 11, wherein the one or more gesture motion filters comprise one or more of a first gesture motion filter to filter out detected object motion occurring within a threshold distance of an image sensor and a second gesture motion filter to filter out detected object motion that stays within a field of view of the image sensor for less than a threshold amount of time.

13. The mixed reality computing system of claim 11, wherein the remote input device comprises an inertial measurement unit (IMU) and a user-actuatable input device, and wherein the instructions are further executable to detect that the remote input device is in use based on one or more of detecting that the remote input device is in a field of view of an image sensor, receiving a user input via the user-actuatable input device of the remote input device, and receiving output from the IMU of the remote input device.

14. The mixed reality computing system of claim 11, wherein the instructions are further executable to perform an action based on the object motion tracking.

* * * * *